United States Patent [19]

Brown

[11] Patent Number: 5,010,988
[45] Date of Patent: Apr. 30, 1991

[54] EXPANDABLE SHOCK PROTECTED CARRYING CASE

[76] Inventor: Lauren Brown, 3704 NW. 82nd St., Miami, Fla. 33147

[21] Appl. No.: 495,614

[22] Filed: Mar. 19, 1990

[51] Int. Cl.⁵ .................... A45C 7/00; B65D 85/30
[52] U.S. Cl. .................................. 190/104; 190/111; 190/125; 190/127; 206/320; 206/521
[58] Field of Search .................... 206/521, 305, 320; 190/103, 104, 109, 111, 115, 117, 124, 125, 127

[56] References Cited

U.S. PATENT DOCUMENTS

| | | | |
|---|---|---|---|
| 1,976,390 | 10/1934 | Ferrera | 190/109 X |
| 3,110,369 | 11/1963 | Ruzicka | 206/305 X |
| 3,443,671 | 5/1969 | Dyke | 190/103 |
| 3,483,954 | 12/1969 | Michalski | 190/102 X |
| 3,746,605 | 7/1973 | Dillon et al. | 206/521 X |
| 3,769,145 | 10/1973 | Greshau et al. | 206/521 X |
| 4,090,593 | 5/1978 | Koff | 190/103 |
| 4,257,463 | 3/1981 | Monaco | 190/900 X |
| 4,773,515 | 9/1988 | Kotkins, Jr. | 190/103 |
| 4,837,590 | 6/1989 | Sprague | 206/320 X |
| 4,953,673 | 9/1990 | Awbasz | 190/127 X |

FOREIGN PATENT DOCUMENTS

| | | | |
|---|---|---|---|
| 2508288 | 12/1982 | France | 190/125 |
| 588568 | 5/1947 | United Kingdom | 190/103 |
| 859995 | 1/1961 | United Kingdom | 190/125 |

Primary Examiner—Bryon P. Gehman
Attorney, Agent, or Firm—Malloy, Downey & Malloy

[57] ABSTRACT

A carrying case specifically adapted for use in carrying lap top computers, printers, fax machines and the like comprising a case having an outer shell formed of a durable waterproofed material and a case interior including a main storage compartment and a secondary storage compartment. An expansion zone formed on a surrounding side wall structure allows the secondary storage compartment to be adjustable between a collapsed stowed position and an expanded operative position thereby providing a second compartment to store computer equipment. The carrying case further includes a shock barrier construction defined by a layer of shock absorbent material fitted between the exterior shell and an inner lining in surrounding protecting relation to the case interior.

20 Claims, 4 Drawing Sheets

FIG. 1

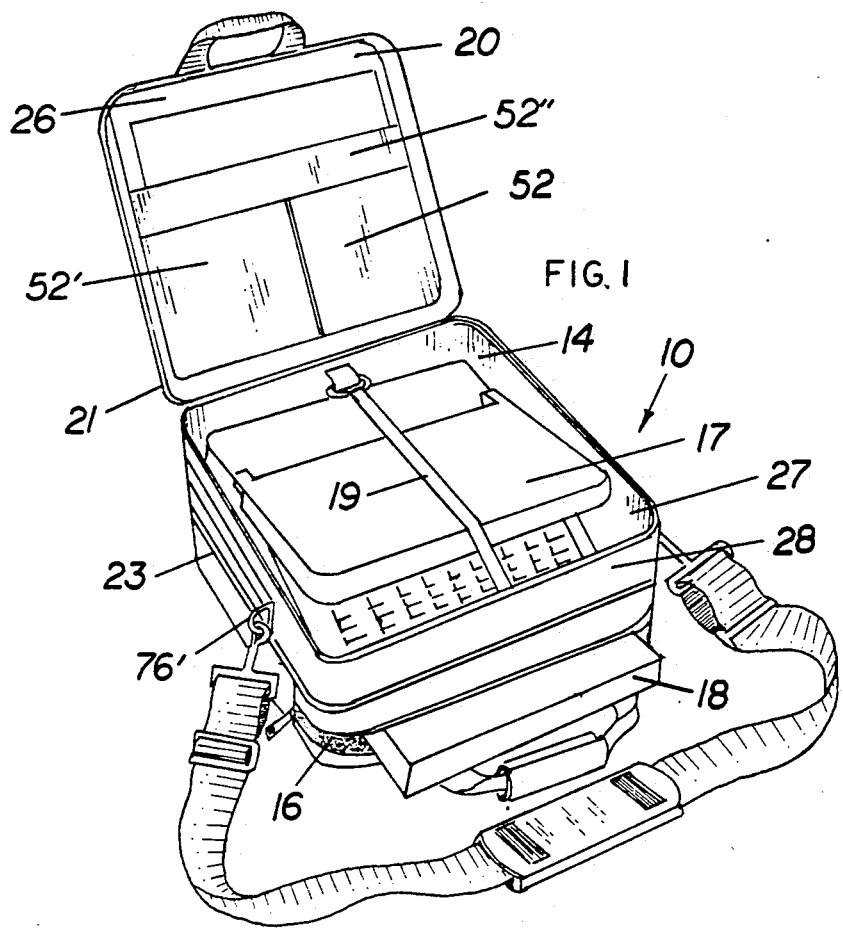
FIG. 1
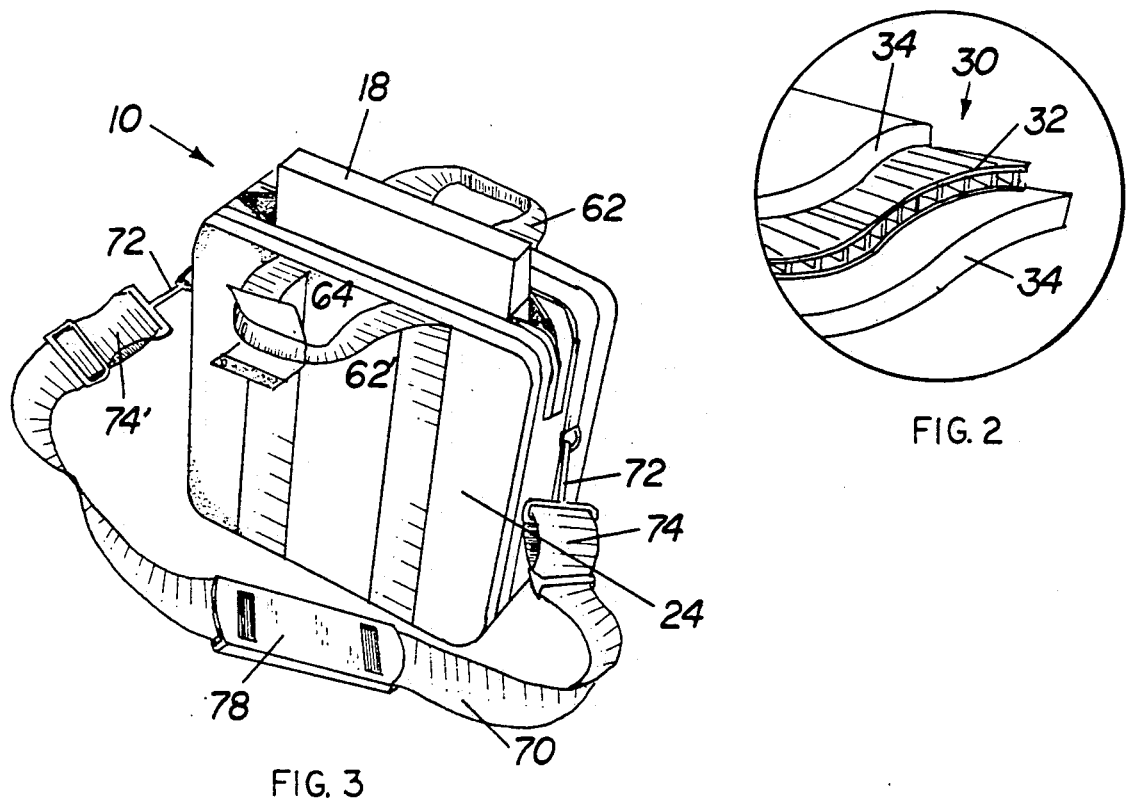
FIG. 3
FIG. 2

EXPANDABLE SHOCK PROTECTED CARRYING CASE

BACKGROUND OF THE INVENTION

1. Field of the Invention

An expandable carrying case for use in carrying computer related equipment including, but not limited to, lap top computers, printers, fax machines and the like wherein the carrying case includes a shock barrier construction to protect the equipment stored therein.

2. Description of the Prior Art

There are numerous carrying cases in the prior art, some of which are specifically adapted for use in carrying computer equipment. Further, there are carrying cases in the prior art which have expansible joint sections to increase the size of the storage area. Many of these carrying cases include a multi-compartment structure which allows for storage of more than one article or piece of equipment.

Most computer related components such as hard drives, printers, fax machines and keyboards are sensitive to shock and thus, extreme care must be exercised when transporting these components from one place to another. To allow easier transport of many of these computer related components, numerous carrying cases have been designed in the prior art which are specifically adapted for carrying a single computer component or a number of computer components thereby making transport between locations much safer and efficient. Frequently, these carrying cases are made of a nylon or canvas material and include some type of stiffening means within the outer walls to maintain sufficient rigidity. While these carrying cases make transport of computer equipment much easier, they still do not protect the delicate components from damage due to impact from dropping or bumping the case during transport.

Accordingly, there is still a need in the computer industry for a carrying case which is specifically adapted to carry at least one computer component, and preferably, several components wherein the carrying case includes a shock barrier construction formed in the outer exposed walls of the case for absorbing shock impact commonly encountered during transport of such equipment. Additionally, there is a need in the prior art for a carrying case for computer components which includes an expandable compartment which can be adjusted between a stowed position and an operable position wherein a single component can be carried in a reduced size carrying case or a number of components can be carried with the carrying case in an expanded mode.

SUMMARY OF THE INVENTION

The present invention is directed towards an expandable carrying case for use in carrying computer related components including, but not limited to, lap top computers, printers, fax machines and keyboards. The carrying case includes a main storage compartment which is generally configured to accommodate most lap top computers, printers and the like. An interior dividing wall separates the main storage compartment from a secondary storage compartment which is adjustable between a collapsed stowed position and a fully expanded operable position by means of an expandable zone.

The carrying case includes an exterior shell preferably formed of Dupont Cordura® fabric which is a waterproofed, stain and tear resistant material having a substantially rigid yet flexible character. The case interior is lined with a substantially smooth nylon lining which surrounds and substantially covers the entire interior wall construction in both the main storage compartment and the secondary storage compartment. Fitted between the exterior shell and the interior lining, there is a cellular armor forming a shock barrier which comprises a double walled honeycombed thermoplastic material sandwiched between two layers of cushioning foam. The shock barrier is specifically designed to absorb shock impact, thereby preventing damage to sensitive computer equipment being carried within the compartments of the carrying case. When the secondary storage compartment is in the expanded operable position, a plurality of cellular armor inserts are placed along the walls of the expansion zone within the compartment interior. The cellular armor inserts are constructed in a similar manner as the shock barrier construction within the remaining exterior walls as described above.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the preferred embodiment of the present invention showing various computer related components being stored in the storage compartments.

FIG. 2 is an isolated view illustrating the shock barrier construction within the walls of the carrying case.

FIG. 3 is a perspective view of the preferred embodiment of the present invention shown in an upright position.

Like reference numerals refer to like parts throughout the several views of the drawings.

DETAILED DESCRIPTION OF THE PREFERRED EMBODIMENT

Figure 4:
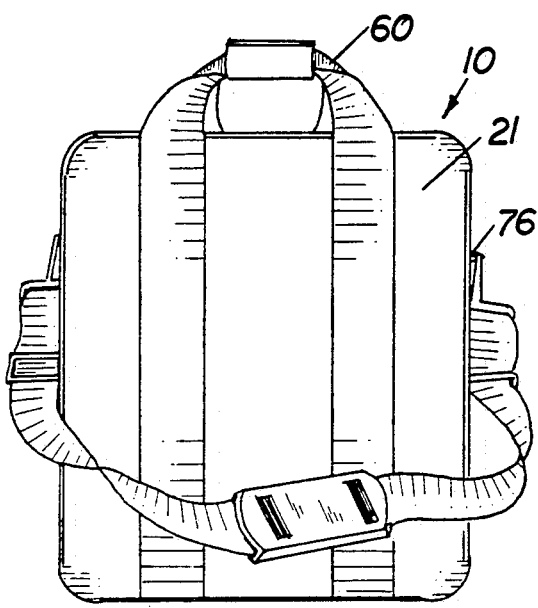
FIG. 4 is a rear view showing the rear panel of the carrying case.
Figure 5:
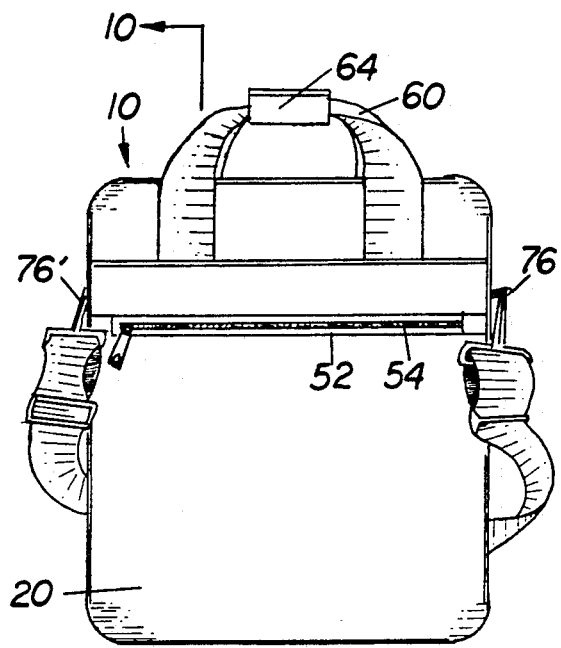
FIG. 5 is a front view showing the front panel of the carrying case.
Figure 6:
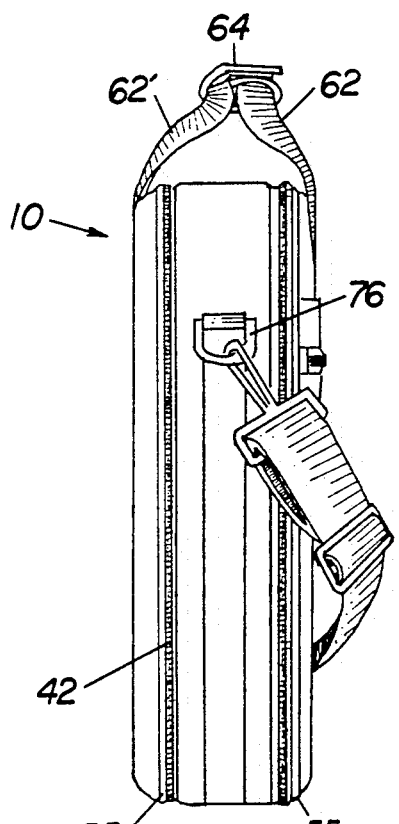
FIG. 6 is a side view illustrating the preferred embodiment of the present invention with the secondary storage compartment in a collapsed position.
Figure 7:
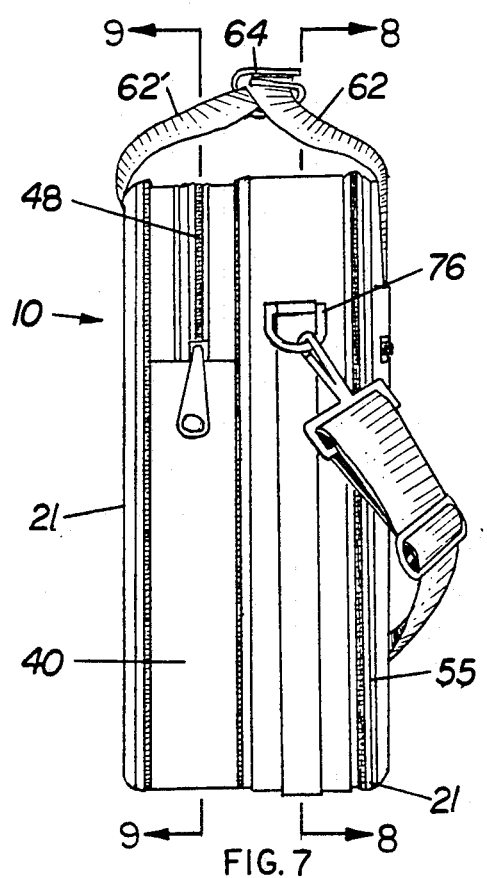
FIG. 7 is a side view of the preferred embodiment of the present invention illustrating the secondary storage compartment in an expanded operable position.

As shown in FIGS. 1 through 9, the present invention is directed towards a carrying case for use in carrying various computer related components, the carrying case being generally indicated as 10. As seen in FIG. 1, the carrying case 10 includes a main storage compartment 14 and a secondary storage compartment 16 wherein various computer related components 17 and 18 can be stored for transport. A tie down strap 19 is fitted within each of the storage compartments for use in securing the computer components 17 and 18. A front panel 20 is disposed in covering relation to the main storage compartment and can be opened to permit access therein by means of a zipper 21 disposed about a peripheral edge as best illustrated in FIG. 7. An peripheral interior dividing wall 23 separates the main storage compartment 14 and the secondary storage compartment 16. Connecting between the front panel 20 and a rear panel 22, there is a surrounding side wall 28 which effectively encloses the case interior.

Figure 8:
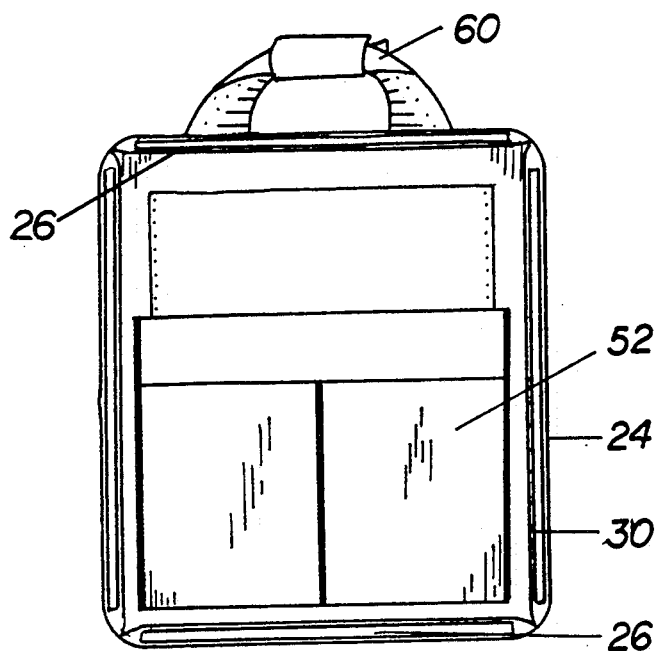
FIG. 8 is a sectional view along line 8—8 of FIG. 7 showing the interior of the main storage compartment.
Figure 9:
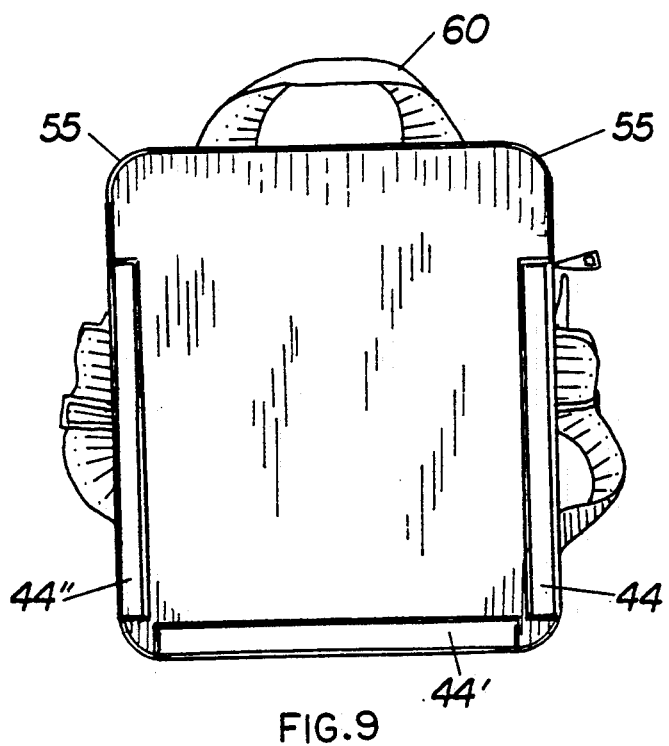
FIG. 9 is a sectional view along line 9—9 of FIG. 7 illustrating the interior of the secondary storage compartment.
Figure 10:
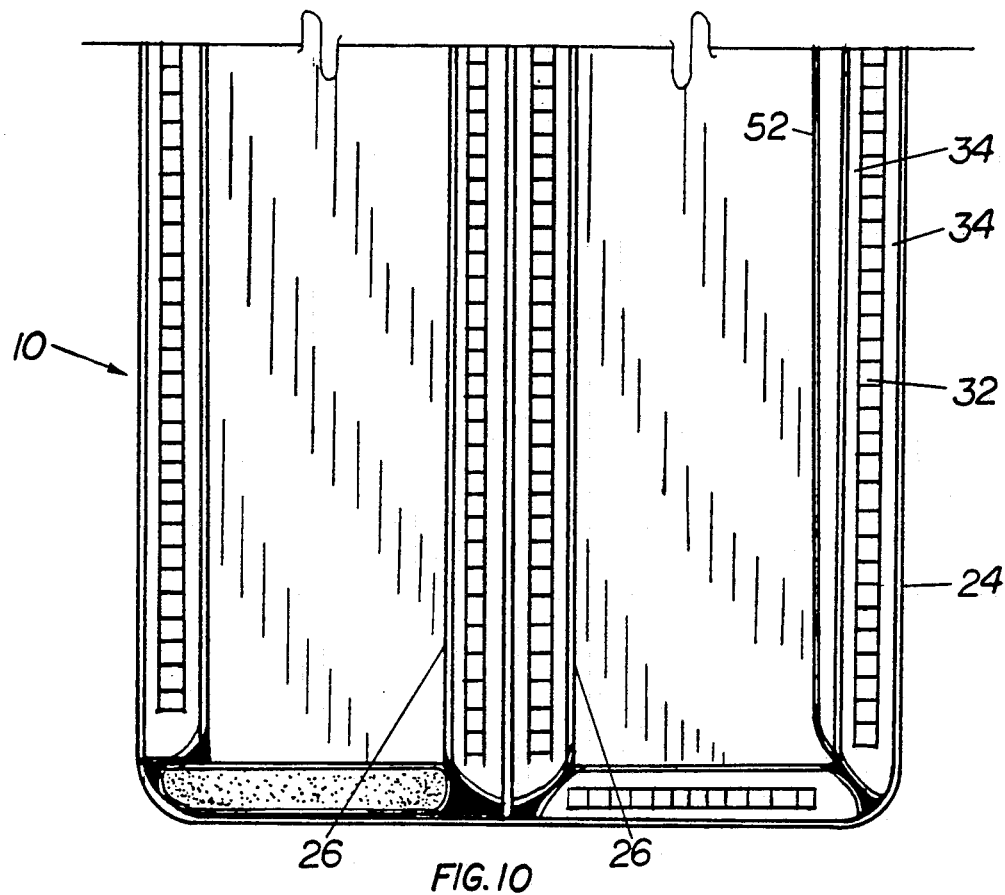
FIG. 10 is a sectional view taken along line 10—10 of FIG. 5 illustrating the wall construction, including an inner lining, of the carrying case of the present invention.

The carrying case in the preferred embodiment of the present invention includes an exterior shell 24 which is preferably formed from a waterproofed, stain and tear resistant fabric such as Dupont Cordura ®. An inner nylon lining 26 surrounds and substantially covers an interior surface 27 in each of the compartments 14 and 16 of the carrying case, as best illustrated in FIGS. 1, 8 and 10.

Mounted between the exterior shell 24 and the inner nylon linings 26 there is a shock barrier construction generally indicated as 30 in FIG. 2. The shock barrier construction consists of a cellular armor including a double walled thermoplastic material 32 having a generally honeycombed configuration. The thermoplastic material 32 is sandwiched between two opposing layers of cushioning foam 34 which not only assist in absorbing shock but which act as an insulator against heat and cold thereby protecting any computer equipment stored within the compartments from temperature extremes. In normal use, the carrying case of the present invention is carried in an upright position as shown in FIGS. 3 through 9. When it is only necessary to carry one piece of equipment, only the main storage compartment 14 would be used wherein the secondary storage compartment 16 would be in a collapsed position as best illustrated in FIG. 6. When it is desired to carry an additional piece of equipment, the secondary storage compartment 16 can be expanded into an operable position by means of an expandable zone 40, shown in FIG. 7. The expandable zone 40 includes an outer shell which is formed of the same durable material as the remaining outer shell of the carrying case. To expand the secondary storage compartment to the operable position as shown in FIG. 7, a zipper 42 is opened thereby allowing the rear panel 22 to move outwardly to a fully extended position as shown in FIG. 7 To maintain the secondary storage compartment 16 in the fully expanded position, a plurality of cellular armor inserts 44, 44' and 44" are inserted into the side walls on the interior of the secondary storage compartment. The cellular armor inserts are constructed in a similar manner as the cellular armor shock barrier construction as described and illustrated in FIG. 2. To provide access to the secondary storage compartment, a zipper 48 is disposed about a portion of the expandable zone 40.

Figure 11:
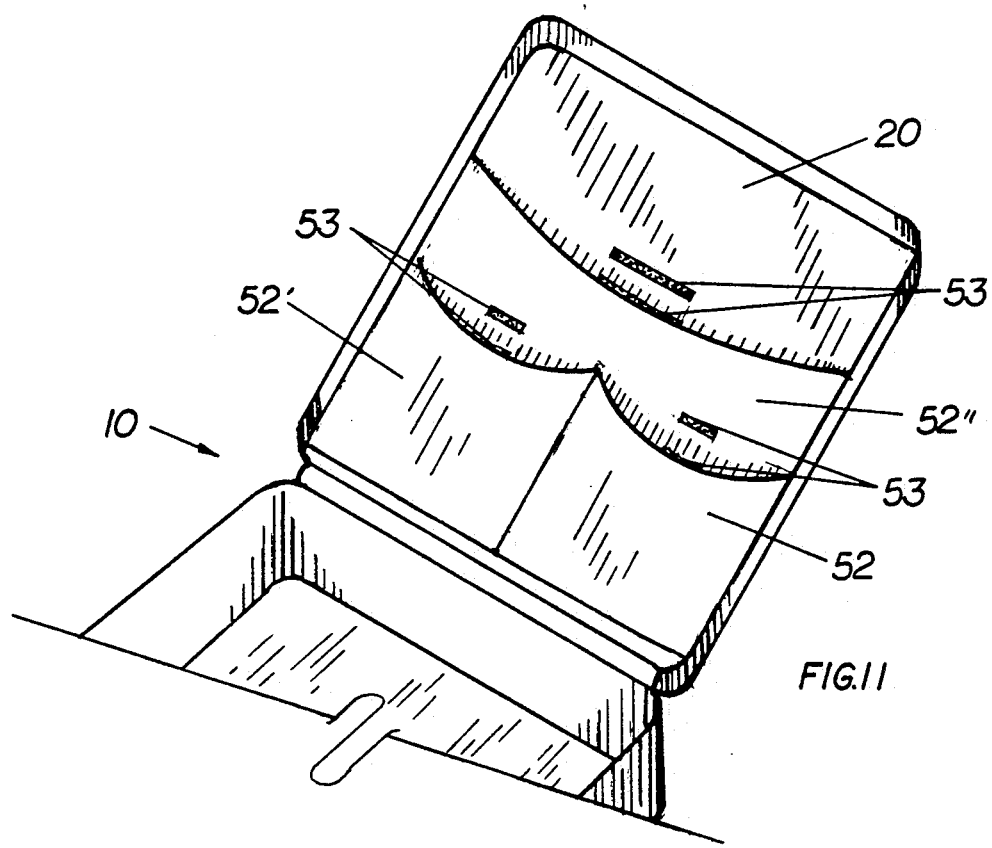
FIG. 11 is an isolated perspective view of the front panel of the carrying case showing organizer pockets within the main storage compartment.

Each of the storage compartments includes a plurality of organizer pockets 52, 52' and 52" as shown in FIGS. 1 and 11. Each of the pockets include Velcro pads 53 for securing the pockets in a closed, substantially sealed position so as to retain the contents therein. Additionally, an exterior storage pocket 54 is preferably mounted on the exterior of the front panel 20 and includes a zipper access 54 extending substantially across its upper portion.

To maintain rigidity and support, a plurality of structural edge supports 55 are fitted around peripheral edges between the exterior shell and the inner nylon lining.

As seen in FIGS. 1 and 3 through 9, the carrying case in the preferred embodiment of the present invention includes a handle 60 including a pair of handle straps 62 and 62'. A handle wrap 64 is fitted to one of the handle straps 62 and is structured to be wrapped around an intermediate section of both handle straps maintaining them relation and providing a comfortable grip handle in close relation and providing a comfortable grip handle wherein both straps can be grasped in unison. Preferably, the handle wrap is fitted with Velcro securing means mounted on confronting surfaces allowing the wrap to be fastened about the straps 62 and 62'.

In addition to the handle 60, the preferred embodiment of the present invention includes a detachable shoulder strap 70 as shown throughout the several views of the drawings In a preferred embodiment, the shoulder strap 70 26 includes a pair of attachment clips 72 and 72' fitted to opposite ends 74 and 74' of the shoulder strap. The attachment clips 72 and 72' are attachable to attachment rings 76 and 76' mounted on opposite sides of the carrying case whereupon the shoulder strap 70 can be attached and detached as desired. The shoulder strap 70 further includes a shoulder pad 78 fitted along an intermediate portion of the strap.

Now that the invention has been described, what is claimed is:

1. An expandable carrying case comprising:
  a case including an exterior shell formed of a substantially rigid, yet flexible material defining an outer exposed surface, said case including a front panel, a rear panel and a surrounding side wall structure connecting between said front and said rear panels in enclosing relation to a case interior,
  a main storage compartment formed in said case interior between said front panel and an interior dividing wall,
  an expansion zone formed in said side wall structure between said interior dividing wall and said rear panel, said expansion zone structured and configured to permit movement of said rear panel relative to said interior dividing wall between a collapsed position and an expanded position,
  a secondary storage compartment formed in said case between said interior dividing wall and said rear panel in the expanded position,
  an inner lining disposed in substantially covering and surrounding relation to an interior surface of said case interior,
  shock absorbing means disposed between said exterior shell and said inner lining and defined by a layer of shock absorbent material structured and configured to absorb impact to said exterior shell and forming a shock barrier between said exterior shell and said case interior, access means formed in said surrounding side wall structure providing access to said main storage compartment and said secondary storage compartment, and handle means disposed on said case for a single handed portability of said case.

2. A carrying case as in claim 1 wherein said exterior shell is formed of a substantially rigid, nylon material.

3. A carrying case as in claim 2 wherein said nylon material is water resistant.

4. A carrying case as in claim 3 wherein said nylon material is stain and tear resistant.

5. A carrying case as in claim 1 wherein said surrounding side wall structure includes four sides extending around an outer periphery of said case and connecting between said front panel and said rear panel.

6. A carrying case as in claim 1 wherein said expansion zone includes a first zipper which is normally closed when said rear panel is in the collapsed positioned, said first zipper being open when said rear panel is in the expanded position.

7. A carrying case as in claim 6 wherein said first zipper is disposed about the outer periphery of said case and structured to maintain said rear panel in the collapsed position when said first zipper is closed.

8. A carrying case as in claim 7 wherein said expansion zone includes said exterior shell formed of a substantially rigid, yet flexible material, said exterior shell being collapsible within said expansion zone allowing said rear panel to move between the expanded position and the collapsed position.

9. A carrying case as in claim 1 wherein said secondary storage compartment includes an operable position defined by said rear panel being in the expanded position.

10. A carrying case as in claim 1 wherein said inner lining is formed of a substantially smooth nylon material disposed in covering relation to the interior surface of said case interior including said main storage compartment and said secondary storage compartment.

11. A carrying case as in claim 10 wherein said shock absorbing means includes a rigid, double-walled thermoplastic material having a honeycomb configuration and disposed in sandwiched relation between two layers of cushioning foam.

12. A carrying case as in claim 11 wherein said shock absorbing means is formed from an insulative material to provide an insulative barrier between said outer exposed surface and said case interior to protect equipment contained therein from temperature extremes.

13. A carrying case as in claim 1 wherein said access means includes a plurality of zipper openings formed in said surrounding side wall structure providing access to said main storage compartment and said secondary storage compartment.

14. A carrying case as in claim 1 wherein said handle means includes a pair of straps each having opposite distal ends connected to said case and further including a handle wrap structured to be fastened about an intermediate portion of said straps in enclosing combining relation thereto, said handle wrap providing a comfortable gripping area.

15. A carrying case as in claim 14 wherein said handle wrap includes a pair of Velcro pads mounted to opposing surfaces to allow said handle wrap to be fastened about said straps.

16. A carrying case as in claim 15 further including a detachable shoulder strap including attachment clips for attaching opposite distal ends of said shoulder strap to opposing sides of said carrying case.

17. A carrying case as in claim 1 wherein said main storage compartment and said secondary storage compartment each include at least one tie-down strap connected to and extending between opposite interior walls of said compartments.

18. A carrying case as in claim 1 wherein said main storage compartment and said secondary storage compartment include organizer pockets disposed on said interior surface, said organizer pockets including Velcro pads for facilitating opening and closing thereof.

19. A carrying case as in claim 1 wherein said carrying case further includes an exterior storage pocket disposed on said front panel and including a zipper access along an upper opening thereof.

20. A carrying case as in claim 1 wherein said carrying case further includes edge supports fitted along peripheral edges of said case between said exterior shell and said inner lining being structured and disposed to provide increased rigidity and support to said carrying case.

* * * * *